United States Patent
Winter et al.

(10) Patent No.: US 12,049,140 B2
(45) Date of Patent: Jul. 30, 2024

(54) SHOCK PROTECTION FOR RADIO-INTERFERENCE-SUPPRESSED VOLTAGE TRANSFORMERS IN A POTENTIAL-FREE DC VOLTAGE NETWORK

(71) Applicant: Robert Bosch GmbH, Stuttgart (DE)

(72) Inventors: Arnold Winter, Filderstadt (DE); Alex Haas, Oberstenfeld (DE); Marcel Maur, Asperg (DE); Martin Lauersdorf, Knittlingen (DE); Rupert Fackler, Pleidelsheim (DE); Stephan Gase, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 583 days.

(21) Appl. No.: 17/289,772

(22) PCT Filed: Oct. 25, 2019

(86) PCT No.: PCT/EP2019/079124
§ 371 (c)(1),
(2) Date: Apr. 29, 2021

(87) PCT Pub. No.: WO2020/089047
PCT Pub. Date: May 7, 2020

(65) Prior Publication Data
US 2021/0394617 A1 Dec. 23, 2021

(30) Foreign Application Priority Data
Oct. 29, 2018 (DE) ...................... 10 2018 218 449.6

(51) Int. Cl.
*B60L 3/00* (2019.01)
*B60L 3/04* (2006.01)

(52) U.S. Cl.
CPC .......... *B60L 3/0069* (2013.01); *B60L 3/0046* (2013.01); *B60L 3/04* (2013.01); *B60L 2210/42* (2013.01)

(58) Field of Classification Search
CPC ........ B60L 3/0046; B60L 3/0069; B60L 3/04; B60L 2210/42
See application file for complete search history.

(56) References Cited

U.S. PATENT DOCUMENTS

| | | | |
|---|---|---|---|
| 9,065,351 B2 * | 6/2015 | Wenger | H02M 1/36 |
| 11,091,038 B2 * | 8/2021 | Moertl | B60L 15/08 |
| 2015/0256116 A1 | 9/2015 | Tateda et al. | |

FOREIGN PATENT DOCUMENTS

| | | |
|---|---|---|
| CN | 102132477 A | 7/2011 |
| CN | 104025437 A | 9/2014 |

(Continued)

OTHER PUBLICATIONS

Translation of International Search Report for Application No. PCT/EP2019/079124 dated Jan. 16, 2020 (2 pages).

*Primary Examiner* — Jue Zhang
*Assistant Examiner* — Afework S Demisse
(74) *Attorney, Agent, or Firm* — Michael Best & Friedrich LLP

(57) ABSTRACT

The arrangement relates to a voltage transformer for transformation between a direct voltage at a direct voltage gate and a single-phase or multi-phase alternating voltage at an alternating voltage gate by temporal clocking of an electronic switching unit, via which each phase of the alternating voltage gate can be connected either to a positive pole or to a negative pole of the direct voltage gate. The positive pole and/or the negative pole of the direct voltage gate is connected via at least one capacitor to a ground connection. The ground connection can be connected to an external ground, and the connection between the capacitor and the ground (Continued)

connection is guided via at least one switch element. The arrangement also relates to a motor vehicle having the electric powertrain. A diagnosis arrangement includes a voltage source and monitors the state and function of a switching element.

15 Claims, 3 Drawing Sheets

(56) References Cited

FOREIGN PATENT DOCUMENTS

| | | |
|---|---|---|
| DE | 3534861 A1 | 4/1987 |
| DE | 102011078687 A1 | 1/2013 |
| DE | 102017202236 A1 | 6/2017 |
| DE | 102017205861 B3 | 8/2018 |
| DE | 102018002926 A1 | 9/2018 |
| DE | 102017220982 A1 | 4/2019 |
| EP | 2763868 B1 | 5/2017 |
| EP | 3375655 A1 | 9/2018 |
| WO | 2013050281 A2 | 4/2013 |

* cited by examiner

SHOCK PROTECTION FOR RADIO-INTERFERENCE-SUPPRESSED VOLTAGE TRANSFORMERS IN A POTENTIAL-FREE DC VOLTAGE NETWORK

The present invention relates to voltage converters that, for example, can be used in electrically driven vehicles and are radio-interference-suppressed using one or more capacitors.

PRIOR ART

Electric motors in the drivetrain of electrically driven vehicles are generally supplied with a multiphase AC voltage. The electrical energy is usually provided as DC voltage on board the vehicle by way of batteries, fuel cells or other energy sources. The multiphase AC voltage is generated from this DC voltage using an inverter. For this purpose, the phases of the AC voltage supply for the electric motor are connected alternately to the positive pole and the negative pole of the DC voltage source with rapid temporal clocking. This is achieved by way of an arrangement of switching elements in the inverter.

As a result of the temporal clocking, the AC voltage is subjected to high-frequency interference which, although it does not impede the operation of the electric motor, is coupled into metal structures of the vehicle via the connection of the electric motor to the vehicle ground. The metal structures can then act as transmitting antennas and emit the interference into the environment, which is not compatible with the requirements relating to the electromagnetic compatibility (EMC). One way of suppressing the interference consists in connecting the DC voltage grid supplying the inverter to the vehicle ground by way of what are known as Y capacitors. Given that the intermediate circuit voltage is typically several hundred volts and is therefore hazardous for humans on contact, there are legal specifications regarding the maximum amount of energy that may be stored capacitively in the DC voltage grid. EP 2 763 868 B1 furthermore proposes discharging capacitors of the intermediate circuit upon certain events, in particular in the event of accidents, in a controlled manner.

DISCLOSURE OF THE INVENTION

Within the context of the invention, a voltage converter has been developed for converting between a DC voltage at a DC voltage gate and a single-phase or multiphase AC voltage at an AC voltage gate. The conversion is achieved as a result of temporal clocking of an electronic switching mechanism via which each phase of the AC voltage gate can be selectively connected to the positive pole or to the negative pole of the DC voltage gate. The positive pole and/or the negative pole of the DC voltage gate are/is connected to a ground terminal via at least one capacitor, which ground terminal can in turn be connected to an external ground, such as a vehicle ground of an electrically driven vehicle, for example. The connection between the capacitor and the ground terminal is routed via at least one switching element.

It has been recognized that, specifically when the voltage converter is used in a vehicle, the hazard potential of the energy stored in the capacitor is drastically reduced when the capacitor is disconnected from the vehicle ground by way of the switching element.

If a pole of the capacitor is connected to the vehicle ground, the DC voltage grid is no longer free of potential. A person at ground potential has to only touch the pole of the DC voltage grid to which the capacitor is connected in order to close the electrical circuit and to receive an electric shock. When both poles of the DC voltage gate (and therefore of the DC voltage grid) are connected to the vehicle ground in each case via a capacitor, it is irrelevant which of these poles is touched.

If, in contrast, the connection between the capacitor and the vehicle ground is disconnected, a pole of the capacitor is no longer accessible for a person that operates the vehicle normally and manipulates said vehicle at a charging connection to charge the traction battery, for example. Only someone who opens the housing of the voltage converter without authorization and with disregard for the provided warnings that the device still contains stored energy even after it has been disconnected from the DC voltage grid of the vehicle could come into contact with the two poles of the capacitor.

The capacitor switched off in this manner is thus excluded from the budget of the energy that is potentially hazardous for humans. This is advantageous in particular in situations in which the vehicle is connected to a charging station because at that moment energy is also being stored in the charging cables and in the charging station itself, and the total energy stored, i.e. in the vehicle, cables and charging station, is taken into account for the hazard assessment.

At first glance it may seem nonsensical to intentionally prevent a capacitor, which serves such an important purpose as radio interference suppression, from performing its function. The inventors have identified that the interference imparted at the AC voltage gate from the voltage converter is only emitted when the electric motor is active and the interference can therefore reach the vehicle ground. At the same time, however, this is the state in which the vehicle is in motion and cannot be touched by people outside of the vehicle. In contrast, when the vehicle is stationary and can be touched, the electric motor is not active and the action of the interference suppression capacitors is not necessary.

Unlike in the case of discharging the capacitor, in the case of disconnection using the switching element there is no trade-off between a high insulation resistance on the one hand and a low discharge resistance on the other hand, and the disconnection functions independently of the capacitance of the capacitor. Therefore, the previous safety-related capacitance limit is completely dispensed with. There is therefore also no longer a trade-off between good interference suppression, for which a high capacitance is advantageous, and personal protection, for which a low capacitance is better. Capacitors with a relatively large capacitance that has not been permissible up until now can be used. Apart from the better interference suppression, these capacitors, in part, have considerable advantages with regard to the required installation space in comparison to the toroidal capacitors with a relatively low capacitance that have been used up until now.

In one advantageous refinement, the capacitor therefore has a capacitance of at least 500 nF, preferably of at least 1 µF and very particularly preferably of at least 10 µF. The capacitance to be specifically chosen is defined by the frequency to be filtered.

In a further particularly advantageous refinement, the voltage converter is designed to interrupt the connection between the capacitor and the ground terminal using the switching element when an acceleration force or deceleration force that exceeds a predefined threshold value acts on the voltage converter. Such an acceleration force or deceleration force can take effect in the event of an accident, for example. Following an accident, it is particularly important to make the vehicle safe to touch so that emergency services are not endangered during rescue work.

The voltage converter can, for example, be coupled to an acceleration sensor and actuate the switching element in response to a high acceleration having been registered. The switching element itself can however also be designed to interrupt the connection between the capacitor and the ground terminal in the event of high acceleration forces, for example. A predetermined breaking point that is destroyed upon the action of force can be provided for this purpose, for example. The connection is therefore also inevitably interrupted when there are no longer any functional control devices or microcontrollers in the vehicle.

In a further particularly advantageous refinement, the voltage converter is designed to establish the connection between the capacitor and the ground terminal using the switching element when a consumer connected to the AC voltage gate of the voltage converter is activated, and to disconnect the connection again when the consumer is deactivated. As described previously, when the voltage converter is used in a vehicle, for example, radio interference is only emitted when the motor supplied by the voltage converter is active. When the motor is not active, the vehicle is stationary. By virtue of the connection to the ground terminal now being disconnected in this state, maximum touch safety is provided whenever the vehicle can in principle be touched by people external to the vehicle.

In principle, every reversible electrical switch is suitable for reversible switching, for example also an electromechanical relay. Greater reliability and wear resistance, especially in the case of very frequent switching operations, can be achieved with semiconductor switches. In a further particularly advantageous refinement, the switching element therefore comprises an arrangement composed of at least two transistors, wherein the transistors comprise bipolar transistors and/or field-effect transistors and wherein the forward directions, defined by the respective collector-emitter path or by the respective source-drain path, of the transistors are connected in antiseries to one another. The antiseries connection is necessary since a collector-emitter path or a source-drain path can only block voltages of one polarity and the polarity with which the capacitor is charged is not established from the outset.

In a further particularly advantageous refinement, the connection between the capacitor and the ground terminal is routed via a series circuit composed of multiple switching elements. Should a switching element be non-functional and no longer able to interrupt the connection, the other switching element can take over this function. Personal protection is therefore still guaranteed, such that in the event of the malfunction of a switch it is still permissible to charge a vehicle at a charging station using the voltage converter, for example.

If the connection between the capacitor and the ground terminal were no longer able to be interrupted and if the highest permissible capacitance were to be exceeded in the case of connection to a charging station, the charging function of the vehicle would have to be blocked for safety reasons. The range of the vehicle would then be limited by the currently available energy supply.

When, in contrast, a switch fails such that the connection between the capacitor and the ground terminal can no longer be established, this is not immediately hazardous for humans, but rather only the radio interference suppression by the capacitor becomes ineffective. This circumstance should also be promptly rectified, but it is not so critical that onward travel has to be immediately stopped and an expensive breakdown service has to be used.

In a further particularly advantageous refinement, diagnosis means that are designed to detect the correct function and/or the actual switching state of at least one switching element are provided. On the one hand, the safety-relevant function of the switching element can give rise to a legal obligation to make the switching element capable of performing diagnostics. On the other hand, the state in which the connection between the capacitor and the ground terminal is permanently interrupted is undesirable with regard to the electromagnetic compatibility (EMC). Specifically when the voltage converter is used in a vehicle, the vehicle, without effective radio interference suppression, becomes a source for wideband radio interference that can be located only with difficulty because it is only sporadically active and simultaneously mobile. Since this interference does not affect the driving behavior of the vehicle directly, without diagnosis means the malfunction remains initially unnoticed by the driver until the Federal Network Agency has identified the vehicle as an interference source and corresponding subsequent costs are incurred.

In a further particularly advantageous refinement, at least one switching element is designed as a changeover switch between a first switching position and a second switching position. The switching element connects the ground terminal, or a further switching element connected between this switching element and the ground terminal, to a voltage source for a test potential in the first switching position and to the capacitor in the second switching position. The diagnosis means comprise means for monitoring the test potential. A test program in which combinations of the switching positions of present switching elements are adjusted and measurements of the test potentials are compared with the values that are to be expected can be run during start-up of the voltage converter and/or during operation on a recurring basis, for example.

As an alternative or in combination, in a further particularly advantageous refinement, the diagnosis means comprise a voltage source that is connected to that side of at least one switching element that is facing away from the ground terminal and means for monitoring the potential on this side of the switching element. This refinement does not require the switching element to be a changeover switch, but rather also functions with switching elements that can only either connect or disconnect the connection between the capacitor and the ground terminal, such as for example the above-described arrangements composed of transistors.

As described previously, a significant application of the voltage converter is supplying an electric motor in an electrically driven vehicle. The invention therefore also relates to an electrical drivetrain for a motor vehicle, having the described voltage converter and an electric motor connected to the AC voltage gate of the voltage converter.

The invention furthermore also relates to a motor vehicle having said drivetrain, wherein the electric motor and the ground terminal of the voltage converter are connected to a common ground of the motor vehicle. In this way, the interference coupled from the voltage converter into the electric motor, and from there into the ground of the motor vehicle, is The current path, from the point at which the electric motor is connected to the ground of the motor vehicle to the point at which the ground terminal of the voltage converter is connected to the ground of the motor vehicle, should span an area that is as small as possible. In this way, the length of the antenna effective for the emission of interference, and therefore the degree of efficiency for this emission, is considerably reduced.

In a further advantageous refinement, the motor vehicle comprises a rechargeable battery for supplying the drivetrain and a safety device that is designed to prevent charging of the battery from an energy source external to the vehicle in response to diagnosis means of the voltage converter determining that the connection between the capacitor and the ground terminal of the voltage converter cannot be interrupted due to a malfunction of one or more switching elements. In this way, situations in which the energy stored entirely capacitively exceeds a critical value through the connection of the energy source external to the vehicle are advantageously avoided. At the same time, the driver is obligated to carry out repairs given that the vehicle is only able to be used in the potentially unsafe state insofar as the energy supply currently available in the battery is sufficient.

In a further advantageous refinement, the motor vehicle comprises a safety device that is designed to output a warning to the driver and to prevent restarting of the motor vehicle after a predefined driving distance or time has elapsed and/or to restrict the rotational speed and/or the torque of the electric motor in response to diagnosis means of the voltage converter determining that the connection between the capacitor and the ground terminal of the voltage converter cannot be established due to a malfunction of one or more switching elements. As described previously, a constantly interrupted connection is not acutely hazardous, but does lead to the vehicle no longer satisfying the requirements relating to the electromagnetic compatibility (EMC). Since meeting these requirements is a prerequisite for licensing the vehicle and the driver is responsible for the technically faultless state of his vehicle in general, it is appropriate that the driver be obligated to carry out repairs in this fault situation too.

Further measures that improve the invention will be explained in more detail below together with the description of the preferred exemplary embodiments of the invention with reference to figures.

EXEMPLARY EMBODIMENTS

FIG. 1 shows an exemplary schematic illustration of a voltage converter 1 in a drivetrain 10 that is installed in a motor vehicle 100;

Figure 1:
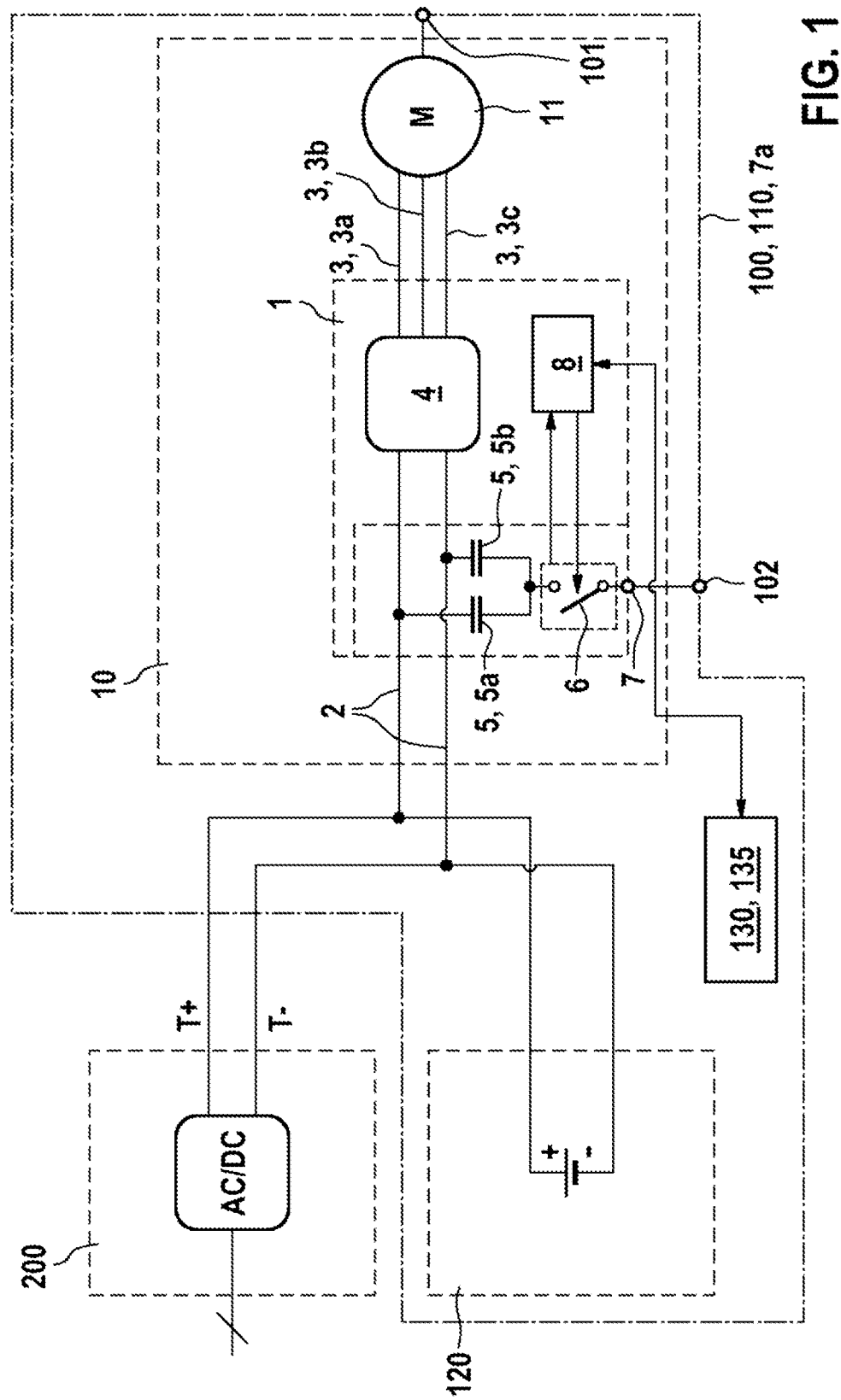

According to FIG. 1, the voltage converter 1 in the drivetrain 10 of the motor vehicle 100 is used to convert a DC voltage applied to its DC voltage gate 2 into a three-phase AC voltage that is output on the three phases 3a, 3b, 3c of its AC voltage gate 3. The electric motor 11 in the drivetrain 10 is supplied with this AC voltage. The conversion takes place as a result of temporal clocking of an electronic switching mechanism 4 that is not shown in more detail.

The AC voltage is subjected to high-frequency interference as a result of the temporal clocking in the switching mechanism 4. Since the electric motor 11 is connected to the ground 110 of the motor vehicle 100 at the point 101, this interference couples into metal parts of the motor vehicle 100. These metal parts act as antennas that emit the high-frequency interference. The pole T+ of the DC voltage gate 2 is therefore connected to the ground terminal 7 of the voltage converter 1 via the capacitor 5a. The pole T− of the DC voltage gate 2 is connected to the ground terminal 7 of the voltage converter 1 via the capacitor 5b. These connections are routed via the switching element 6. The ground terminal 7 is connected to the ground 110 of the motor vehicle 100 as external ground 7a at the point 102.

Within the drivetrain 10, multiple capacitors can also be combined at a common ground potential which for its part is connected to the ground 110 of the motor vehicle 100. This can then, for example, be particularly easily incorporated into the motor vehicle 100 when the drivetrain 10 is a closed assembly that is integrated as a whole into the motor vehicle 100.

When the switching element 6 is switched on, the high-frequency interference is drawn from the vehicle ground 110 back into the voltage converter 1 and in this respect short-circuited. In this way, emission of this interference into the environment is considerably reduced. However, in this state the vehicle ground 110 is connected to a respective pole of each of the two capacitors 5a, 5b. During manipulation of the vehicle 100, touching just one of the two poles T+, T− of the DC voltage gate 2 is enough to receive an electric shock from the energy stored in one of the capacitors 5a, 5b.

When the electric motor 11 is not active and the radio interference suppression through the capacitors 5a and 5b is not needed, the switching element 6 is therefore advantageously switched off. The pole of each of the two capacitors 5a, 5b that is respectively connected to the switching element 6 is then no longer accessible for people such that the capacitances of these capacitors 5a, 5b no longer constitute a hazard potential.

This is particularly important when the traction battery 120 of the motor vehicle 120 is charged from an external charging station 200 because the charging station 200 and the cable connection to the motor vehicle 100 introduce further capacitances.

Diagnosis means 8 are provided for monitoring this safety-relevant function. There are two types of malfunction that can arise.

On the one hand, the switching element 6 can be stuck in the on switching position, which has the result that the connection between the capacitors 5a, 5b and the ground terminal 7 can no longer be interrupted. There would be a risk of electric shock in particular during charging of the traction battery 120 from the charging station 200. In this case, charging is therefore prevented by the safety device 130. The driver of the vehicle 100 has to manage with the energy supply remaining in the battery 120 and visit a garage.

On the other hand, the switching element 6 can be stuck in the off switching position. In this case, the vehicle 100 is always safe to touch but there is no radio interference suppression. In this case, therefore, a warning is output to the driver by the safety device 135. If the fault is not remedied within a predefined driving distance or time, the vehicle 100 is prevented from restarting. In the case of this fault there is also an obligation to carry out repairs. Instead of completely preventing restarting of the vehicle 100, the rotational speed and/or the torque of the electric motor 11 can also just be restricted so that the vehicle 100 can at least reach a garage under its own power ("limp home function").

Figure 2:
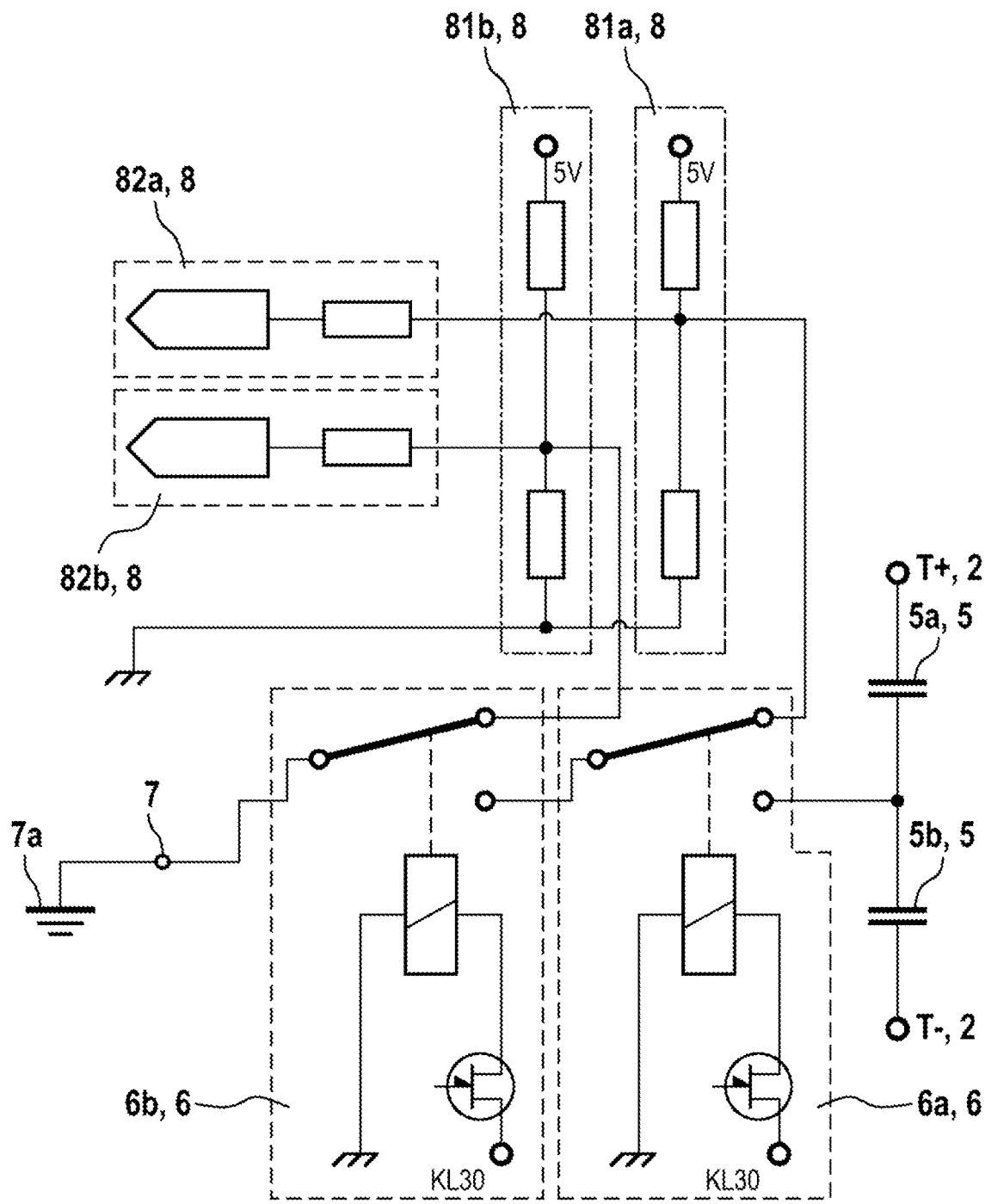
FIG. 2 shows an exemplary schematic detail view of switching elements 6a, 6b that are designed as changeover switches, and associated diagnosis means 8.

In order to reduce the likelihood of the charging having to be prevented due to a fault, two switching elements 6a and 6b are connected in series in the exemplary embodiment shown in FIG. 2. The switching elements 6a, 6b are in the form of relays in this case.

The switching element 6a connects the second switching element 6b to the voltage source 81a for a test potential in its switching position shown in FIG. 2. The switching element 6a connects the second switching element 6b to the capacitors 5a and 5b in its switching position not shown in FIG. 2.

The switching element 6b connects the ground terminal 7 to the voltage source 81b for a test potential in its switching position shown in FIG. 2. The switching element 6b connects the ground terminal 7 to the capacitors 5a and 5b in its switching position not shown in FIG. 2, wherein this connection is still provided by the switching element 6a.

In addition to the voltage sources 81a and 81b for the test potentials, the diagnosis means 8 also comprise means 82a, 82b for monitoring these test potentials, which means are realized as analog-to-digital converters with series resistors in this example. Each of the four combinations of switching states of the switching elements 6a and 6b leads nominally to a unique combination of voltage values that are registered by the analog-to-digital converters 82a, 82b. In this way, the actual switching states of the switching elements 6a and 6b can be identified.

Figure 3:
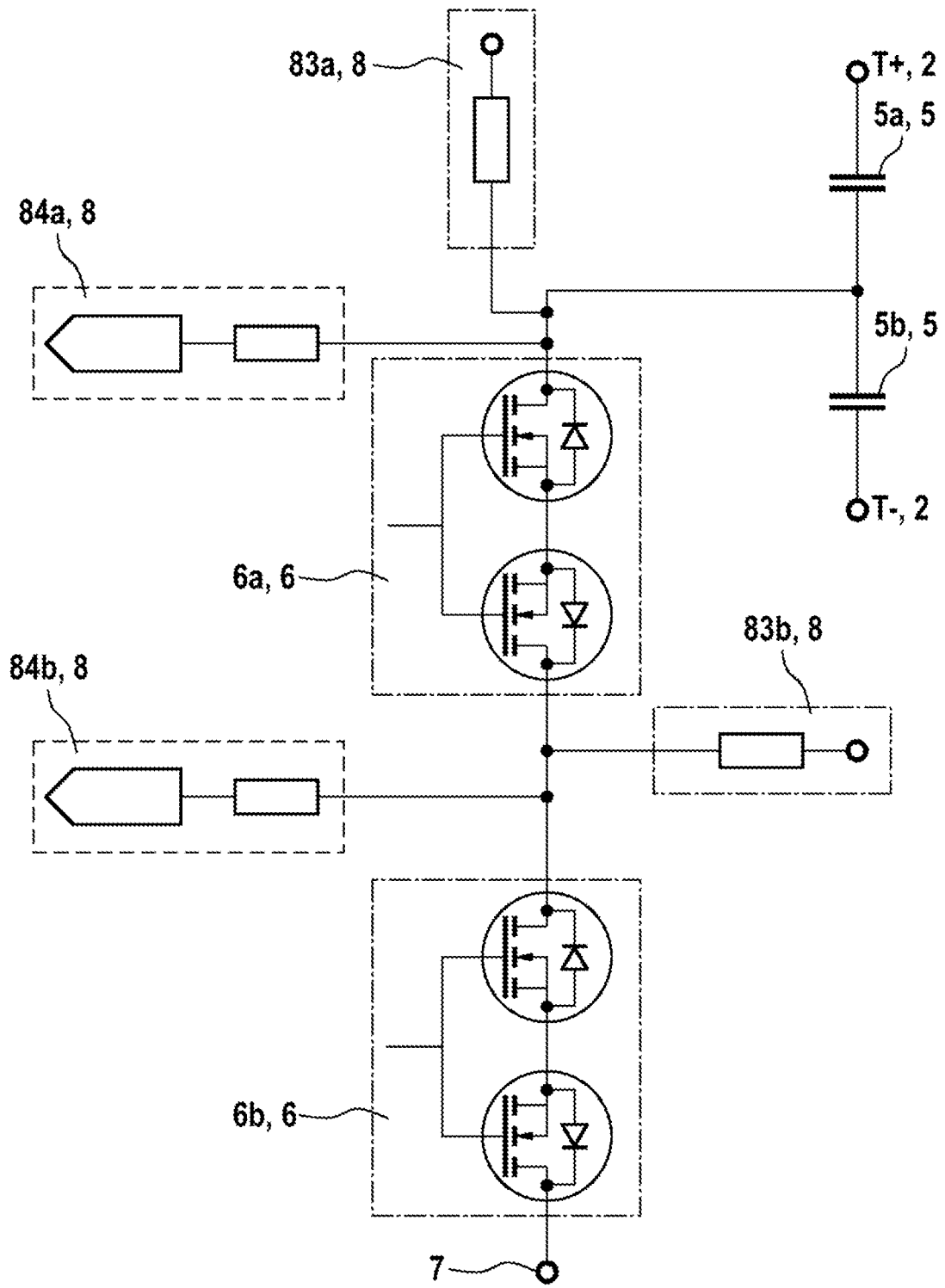
FIG. 3 shows an exemplary schematic detail view of transistorized switching elements 6a, 6b and associated diagnosis means 8.

In the exemplary embodiment shown in FIG. 3, a series circuit composed of two switching elements 6a, 6b is also provided between the capacitors 5a, 5b and the ground terminal 7. In contrast to FIG. 2, the switching elements 6a, 6b are realized in each case as an antiseries connection of two MOSFET transistors, however. Switching elements of this kind do not function, as the relays in FIG. 2 do, as changeover switches, but rather can only either be switched on or off, according to the illustration of the switching element 6 in FIG. 1. The diagnosis means 8 are therefore arranged differently in this case. On that side of each of the switching elements 6a, 6b that is facing away from the ground terminal 7, a voltage source 83a, 83b supplies a test voltage by way of a respective series resistor. In each case the potential is monitored there by means 84a, 84b. In this way, it can be determined whether there is conduction between the means 84a, 84b and the ground terminal 7.

The invention claimed is:

1. A voltage converter (1) for converting between a DC voltage at a DC voltage gate (2) and a single-phase or multiphase AC voltage at an AC voltage gate (3) as a result of temporal clocking of an electronic switching mechanism (4) via which each phase (3a-3c) of the AC voltage gate (3) can be selectively connected to a positive pole or to a negative pole of the DC voltage gate (2), wherein the positive pole and/or the negative pole of the DC voltage gate (2) are/is connected to a ground terminal (7) via at least one capacitor (5, 5a, 5b), wherein the ground terminal (7) is configured to be connected to an external ground (7a), and wherein the connection between the capacitor (5, 5a, 5b) and the ground terminal (7) is routed via at least one switching element (6, 6a, 6b), wherein diagnosis means (8) that are configured to detect the correct function and/or the actual switching state of at least one switching element (6, 6a, 6b) are provided, wherein at least one switching element (6, 6a, 6b) is configured as a changeover switch between a first switching position and a second switching position, wherein the switching element (6, 6a, 6b) connects the ground terminal (7) to a voltage source (81a, 81b) for a test potential in the first switching position and to the capacitor (5, 5a, 5b) in the second switching position.

2. The voltage converter (1) as claimed in claim 1, wherein the voltage converter (1) is configured to establish the connection between the capacitor (5, 5a, 5b) and the ground terminal (7) using the switching element (6, 6a, 6b) when a consumer connected to the AC voltage gate (3) of the voltage converter (1) is activated, and to disconnect the connection again when the consumer is deactivated.

3. The voltage converter (1) as claimed in claim 1, wherein the switching element (6, 6a, 6b) comprises an arrangement composed of at least two transistors, wherein the transistors comprise bipolar transistors and/or field-effect transistors and wherein the forward directions, defined by the respective collector-emitter path or by the respective source-drain path, of the transistors are connected in anti-series to one another.

4. The voltage converter (1) as claimed in claim 1, wherein the connection between the capacitor (5, 5a, 5b) and the ground terminal (7) is routed via a series circuit composed of multiple switching elements (6a, 6b).

5. The voltage converter (1) as claimed in claim 1, wherein the diagnosis means (8) comprise means (82a, 82b) for monitoring the test potential.

6. The voltage converter (1) as claimed in claim 1, wherein the capacitor (5, 5a, 5b) has a capacitance of at least 1 μF.

7. The voltage converter (1) as claimed in claim 1, wherein the capacitor (5, 5a, 5b) has a capacitance of at least 500 nF.

8. The voltage converter (1) as claimed in claim 1, wherein the capacitor (5, 5a, 5b) has a capacitance of at least 10 μF.

9. A voltage converter (1) for converting between a DC voltage at a DC voltage gate (2) and a single-phase or multiphase AC voltage at an AC voltage gate (3) as a result of temporal clocking of an electronic switching mechanism (4) via which each phase (3a-3c) of the AC voltage gate (3) can be selectively connected to a positive pole or to a negative pole of the DC voltage gate (2), wherein the positive pole and/or the negative pole of the DC voltage gate (2) are/is connected to a ground terminal (7) via at least one capacitor (5, 5a, 5b), wherein the ground terminal (7) is configured to be connected to an external ground (7a), and wherein the connection between the capacitor (5, 5a, 5b) and the ground terminal (7) is routed via at least one switching element (6, 6a, 6b), wherein the voltage converter (1) is configured to interrupt the connection between the capacitor (5, 5a, 5b) and the ground terminal (7) using the switching element (6, 6a, 6b) when an acceleration force or deceleration force that exceeds a predefined threshold value acts on the voltage converter (1).

10. A motor vehicle (100) having an electrical drivetrain (10), comprising a voltage converter (1) for converting between a DC voltage at a DC voltage gate (2) and a single-phase or multiphase AC voltage at an AC voltage gate (3) as a result of temporal clocking of an electronic switching mechanism (4) via which each phase (3a-3c) of the AC voltage gate (3) can be selectively connected to a positive pole or to a negative pole of the DC voltage gate (2), wherein the positive pole and/or the negative pole of the DC voltage gate (2) are/is connected to a ground terminal (7) via at least one capacitor (5, 5a, 5b), wherein the ground terminal (7) is configured to be connected to an external ground (7a), and wherein the connection between the capacitor (5, 5a, 5b) and the ground terminal (7) is routed via at least one switching element (6, 6a, 6b);
an electric motor (11) connected to the AC voltage gate (3) of the voltage converter (1), wherein the electric motor (11) and the ground terminal (7) of the voltage converter (1) are connected to a common ground (110) of the motor vehicle (100);

a rechargeable battery (120) for supplying the drivetrain (10); and a safety device (130) that is configured to prevent charging of the battery (120) from an energy source (200) external to the vehicle in response to diagnosis means (8) of the voltage converter (1) determining that the connection between the capacitor (5, 5a, 5b) and the ground terminal (7) of the voltage converter (1) cannot be interrupted due to a malfunction of one or more switching elements (6, 6a, 6b).

11. The motor vehicle (100) as claimed in claim 10, wherein the voltage converter (1) is configured to interrupt the connection between the capacitor (5, 5a, 5b) and the ground terminal (7) using the switching element (6, 6a, 6b) when an acceleration force or deceleration force that exceeds a predefined threshold value acts on the voltage converter (1).

12. The motor vehicle (100) as claimed in claim 10, wherein the switching element (6, 6a, 6b) includes an arrangement composed of at least two transistors, wherein the transistors comprise bipolar transistors and/or field-effect transistors and wherein the forward directions, defined by the respective collector-emitter path or by the respective source-drain path, of the transistors are connected in anti-series to one another.

13. A motor vehicle (100) having an electrical drivetrain (10), comprising a voltage converter (1) for converting between a DC voltage at a DC voltage gate (2) and a single-phase or multiphase AC voltage at an AC voltage gate (3) as a result of temporal clocking of an electronic switching mechanism (4) via which each phase (3a-3c) of the AC voltage gate (3) can be selectively connected to a positive pole or to a negative pole of the DC voltage gate (2), wherein the positive pole and/or the negative pole of the DC voltage gate (2) are/is connected to a ground terminal (7) via at least one capacitor (5, 5a, 5b), wherein the ground terminal (7) is configured to be connected to an external ground (7a), and wherein the connection between the capacitor (5, 5a, 5b) and the ground terminal (7) is routed via at least one switching element (6, 6a, 6b);

an electric motor (11) connected to the AC voltage gate (3) of the voltage converter (1), wherein the electric motor (11) and the ground terminal (7) of the voltage converter (1) are connected to a common ground (110) of the motor vehicle (100); and a safety device (135) that is configured to output a warning to the driver and to prevent restarting of the motor vehicle (100) after a predefined driving distance or time has elapsed and/or to restrict the rotational speed and/or the torque of the electric motor (11) in response to diagnosis means (8) of the voltage converter (1) determining that the connection between the capacitor (5, 5a, 5b) and the ground terminal (7) of the voltage converter (1) cannot be established due to a malfunction of one or more switching elements (6, 6a, 6b).

14. The motor vehicle (100) as claimed in claim 13, wherein the voltage converter (1) is configured to interrupt the connection between the capacitor (5, 5a, 5b) and the ground terminal (7) using the switching element (6, 6a, 6b) when an acceleration force or deceleration force that exceeds a predefined threshold value acts on the voltage converter (1).

15. The motor vehicle (100) as claimed in claim 13, wherein the switching element (6, 6a, 6b) includes an arrangement composed of at least two transistors, wherein the transistors comprise bipolar transistors and/or field-effect transistors and wherein the forward directions, defined by the respective collector-emitter path or by the respective source-drain path, of the transistors are connected in anti-series to one another.

\* \* \* \* \*